United States Patent [19]

Kanada et al.

[11] Patent Number: 4,723,728
[45] Date of Patent: Feb. 9, 1988

[54] APPARATUS FOR REDUCING WEBBING WIND-UP FORCE

[75] Inventors: Shigeyasu Kanada; Yuji Nishimura, both of Niwa, Japan

[73] Assignee: Kabushiki Kaisha Tokai-Rika-Denki-Seisakusho, Aichi, Japan

[21] Appl. No.: 797,947

[22] Filed: Nov. 14, 1985

[30] Foreign Application Priority Data

Nov. 16, 1984 [JP] Japan ............................ 59-174076[U]

[51] Int. Cl.⁴ ...................... B60R 22/34; B65H 75/48
[52] U.S. Cl. .................................. 242/107.6; 297/475
[58] Field of Search ............. 242/107.6, 107.7, 107.12; 280/807; 297/475

[56] References Cited

U.S. PATENT DOCUMENTS

| | | | |
|---|---|---|---|
| 2,976,959 | 3/1961 | Husted | 242/107.6 X |
| 4,261,530 | 4/1981 | Asai et al. | 242/107.6 X |
| 4,467,982 | 8/1984 | Tajima et al. | 242/107.6 |
| 4,511,101 | 4/1985 | King | 242/107.7 |
| 4,534,441 | 8/1985 | Kamijo et al. | 242/107.6 X |

FOREIGN PATENT DOCUMENTS

| | | | |
|---|---|---|---|
| 33220 | 3/1977 | Japan | 242/107.6 |
| 33221 | 3/1977 | Japan | 242/107.6 |
| 59-92233 | 5/1984 | Japan | |

Primary Examiner—Stuart S. Levy
Assistant Examiner—Joseph J. Hail, III
Attorney, Agent, or Firm—Parkhurst & Oliff

[57] ABSTRACT

An apparatus for reducing webbing wind-up force has a ratchet which rotates together with a take-up shaft for winding up a webbing, a rocker arm with a pawl engageable with the ratchet, a bidirectional solenoid for causing the rocker arm to pivot, and a snap action spring. When an occupant has the webbing fastened, the bidirectional solenoid is activated for a predetermined period of time so that the pawl is engaged with the ratchet, and thereafter, the rocker arm is held in its engagement position by the action of the snap action spring. When the occupant unfastens the webbing, the bidirectional solenoid is activated for a predetermined period of time in the direction opposite to that in the above operation so that the pawl is disengaged from the ratchet, and thereafter, the rocker arm is held in its disengagement position by the action for the snap action spring. Thus, it is possible to reduce the amount of electric power consumed by the bidirectional solenoid.

1 Claim, 6 Drawing Figures

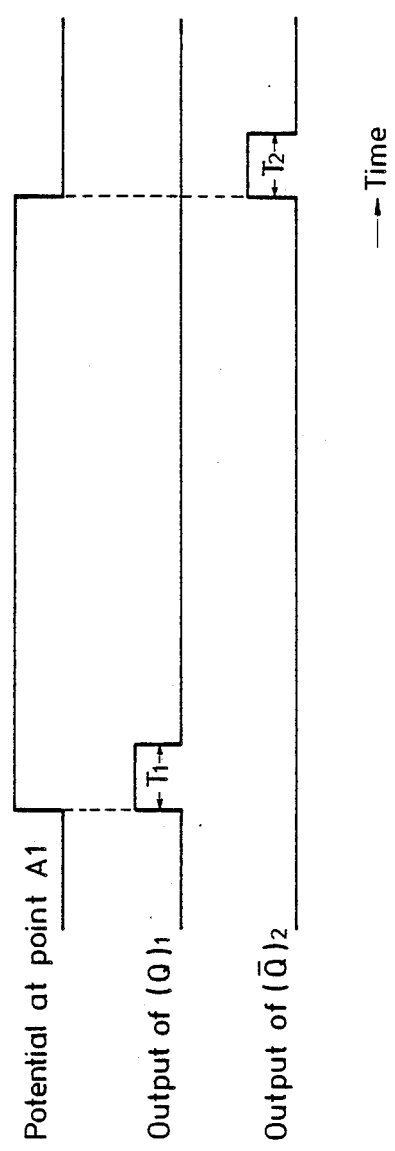

APPARATUS FOR REDUCING WEBBING WIND-UP FORCE

BACKGROUND OF THE INVENTION

1. Field of the Invention

The present invention relates to a webbing wind-up force reducing apparatus for use in a seatbelt system designed to protect an occupant of a vehicle in an emergency situation of the vehicle, the apparatus being employed to reduce the webbing wind-up force which acts such as to apply pressure to the body of the occupant.

2. Description of the Related Art

A typical seatbelt system is arranged such that an occupant restraining webbing can be fully wound up on a webbing take-up shaft by means of the biasing force of a spiral spring. With this arrangement, when an occupant has the webbing fastened, the webbing tension unnecessarily increases and makes the occupant feel the pressure from the webbing. In order to overcome this disadvantage, a webbing wind-up force reducing apparatus has been devised which is provided with a ratchet wheel which rotates together with the webbing take-up shaft in one unit, and a pawl which is engageable with the ratchet wheel, whereby the webbing take-up shaft is prevented from rotating in the direction in which the webbing is wound up when the occupant has the webbing fastened in a normal state of the vehicle (see the specification of Japanese Patent Laid-Open No. 92233/1984). Provision of this apparatus on a webbing retractor eliminates any possibility of the occupant feeling the pressure from the webbing when he has the webbing fastened in a normal state of the vehicle.

The above-described conventional apparatus, however, suffers from the disadvantage that it is necessary to cause the pawl to engage with the ratchet wheel by the action of an actuator and to maintain this engaged state for a long period of time, which fact necessitates to supply the actuator with a relatively large amount of electric power.

SUMMARY OF THE INVENTION

It is a primary object of the present invention to provide a webbing wind-up force reducing apparatus capable of reducing the pressure applied to the body of the occupant from the webbing when he has the webbing fastened and of reducing the amount of electric power consumed by the actuator.

To this end, the present invention provides a webbing wind-up force reducing apparatus which comprises: a take-up shaft for winding up an occupant restraining webbing; a resilient member for biasing the take-up shaft in the direction in which the webbing is wound up; a ratchet wheel which rotates together with the take-up shaft; a rocker arm with a pawl engageable with the ratchet wheel; an actuator which causes the rocker arm to pivot so that the pawl is engaged with and disengaged from the ratchet wheel; and means for retaining the rocker arm at an engagement position at which the pawl is in engagement with the ratchet wheel and at a disengagement position at which the pawl is out of engagement with the ratchet wheel.

According to another aspect of the present invention, the above-described apparatus is further provided with means for detecting whether or not a tongue plate connected to the webbing and a buckle device are engaged with each other, and a control means which outputs a signal for activating the actuator, whereby the actuator is activated by the control means so that when the tongue plate and the buckle device are engaged with each other, the pawl is engaged with the ratchet wheel, while when the tongue plate and the buckle device are disengaged from each other, the pawl is disengaged from the ratchet wheel.

When the actuator is activated so as to pivot the rocker arm and the pawl is thereby engaged with the ratchet wheel, this engaged state is maintained by the retaining means.

Accordingly, it is possible to reduce the amount of electric power which is to be supplied to the actuator for the purpose of maintaining the engaged state.

When the actuator is activated in the direction opposite to that in the above operation so as to pivot the rocker arm in the direction opposite to the above and the pawl is thereby disengaged from the ratchet wheel, this disengaged state is maintained by the retaining means.

It is therefore possible to reduce the amount of electric power which is to be supplied to the actuator for the purpose of maintaining the disengaged state.

Since the webbing wind-up force reducing apparatus according to the present invention is provided with the means for retaining the rocker arm at the engagement and disengagement positions at which the pawl is in and out of engagement with the ratchet wheel, respectively, it is possible to reduce the amount of electric power which is to be supplied to the actuator in order to maintain either the engaged or disengaged state of the pawl. Accordingly, the present invention offers the advantage that it is possible to reduce the power consumption.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIG. 6 is a waveform chart showing the operation of the control circuit shown in FIG. 5.

DESCRIPTION OF THE PREFERRED EMBODIMENT

One embodiment of the webbing wind-up force reducing apparatus according to the present invention will be described below with reference to the accompanying drawings.

Figure 1:
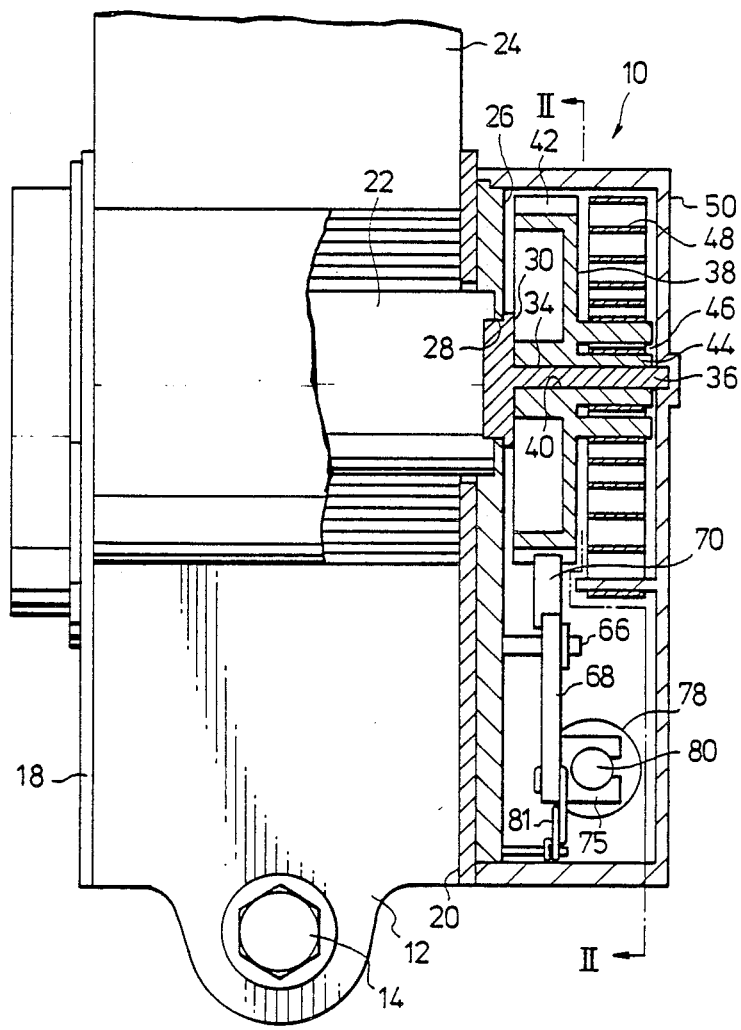
FIG. 1 is a sectional view of a webbing retractor to which one embodiment of the webbing wind-up force reducing apparatus according to the present invention is applied.
Figure 2:
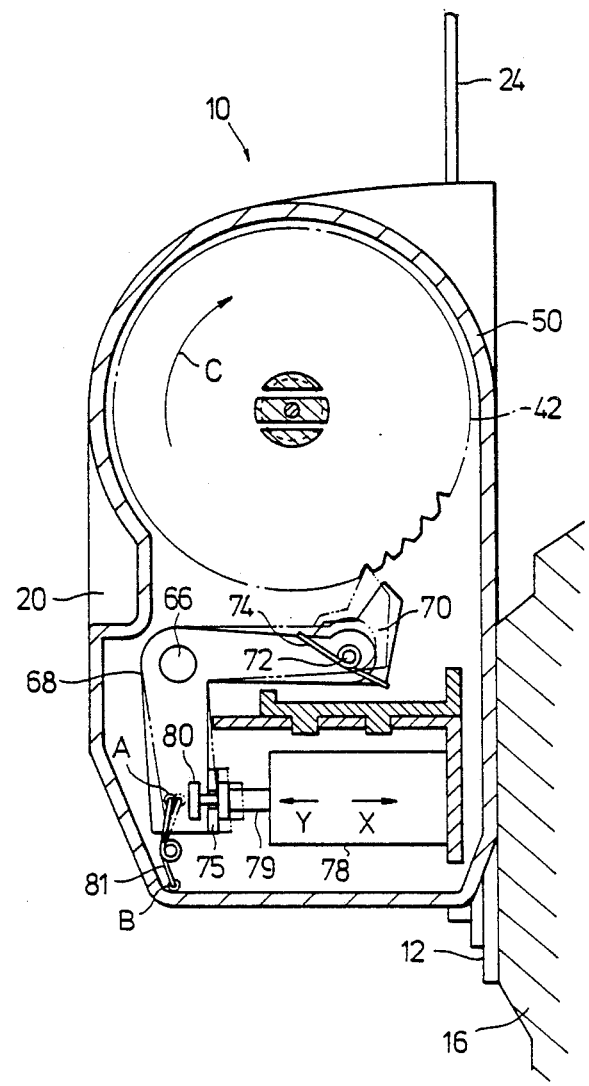
FIG. 2 is a sectional view taken along the line II—II of FIG. 1.
Figure 3:
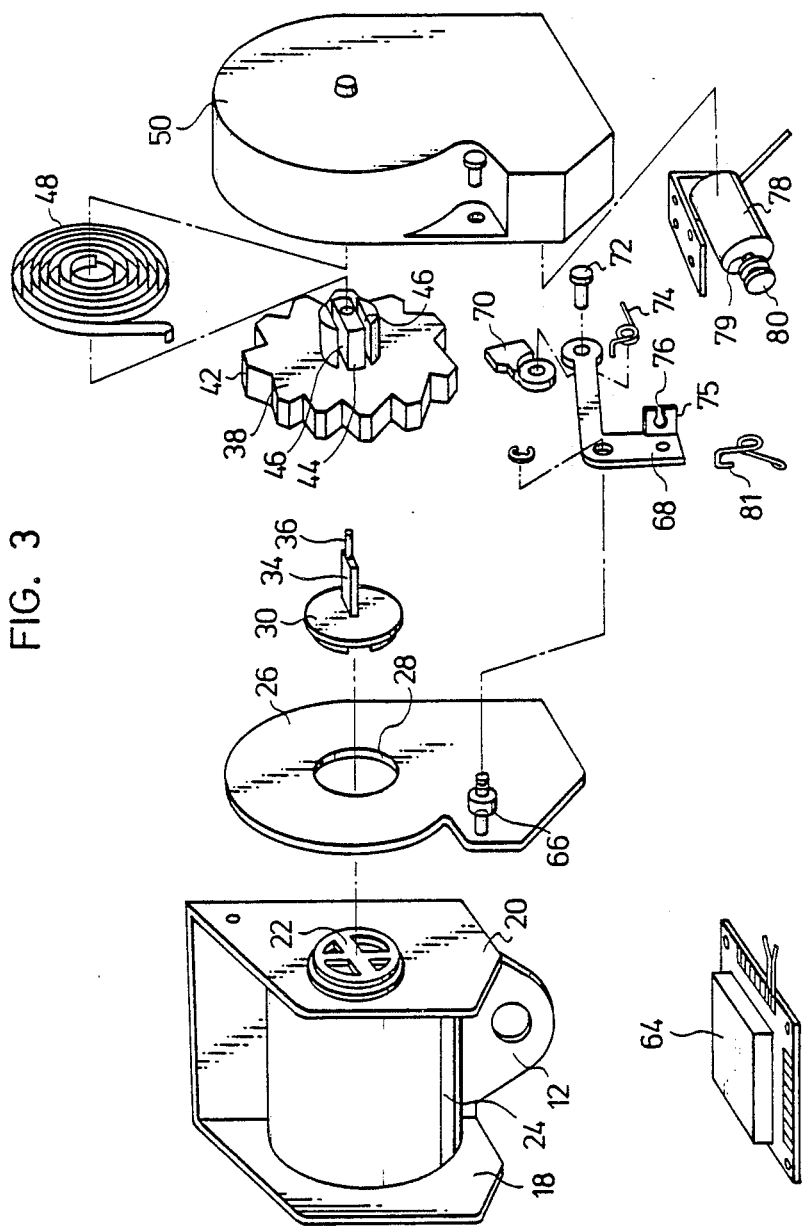
FIG. 3 is an exploded perspective view of the webbing retractor shown in FIG. 1.

FIGS. 1 to 3 show in combination a webbing retractor 10 to which the webbing wind-up force reducing apparatus in accordance with this embodiment is applied.

In this webbing retractor 10, a frame 12 is secured to a vehicle body 16 by means of a mounting bolt 14.

Figure 4:
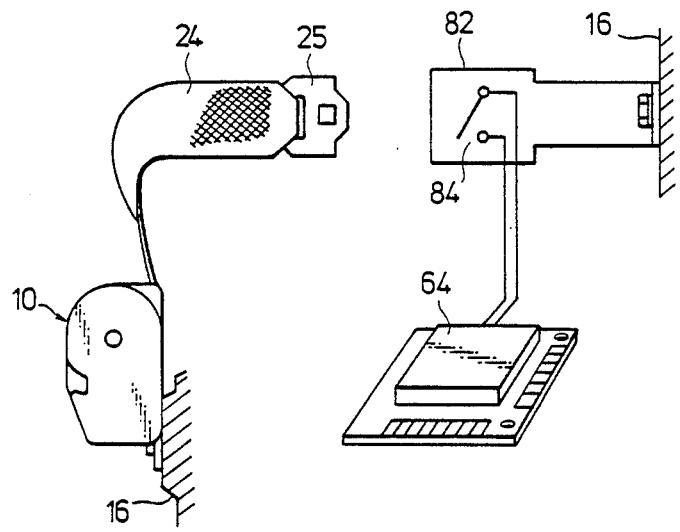
FIG. 4 shows the relationship between a tongue plate and a buckle device.

Two side portions of the frame 12 are bent at right angles so as to provide leg plates 18 and 20 which extend parallel to each other. Both end portions of a take-up shaft 22 are rotatably supported by the leg plates 18 and 20, respectively. The proximal end of an occupant restraining webbing 24 is secured to the central portion of the take-up shaft 22. A tongue plate 25 is connected to the distal end of the webbing 24 (see FIG. 4). The portion of the webbing 24 between the tongue plate 25 and the take-up shaft 22 is employed for fastening an occupant (not shown).

A seat 26 is secured to the outside of the leg plate 20. A circular bore 28 is formed in the seat 26. A connecting shaft 30 is received through the bore 28 and is connected to the end portion of the take-up shaft 22 so that the connecting shaft 30 and the take-up shaft 22 rotate together in one unit. The take-up shaft 22 and the connecting shaft 30 may be formed integrally with each other.

The connecting shaft 30 is provided with a flat shaft 34 in the form of a flat plate. A smaller-diameter shaft 36 is formed at the distal end portion of the shaft 34.

The flat shaft 34 is fitted into a bore 40 with a rectangular cross-section formed in the axial center of a gear wheel 38. Thus, the gear wheel 38 rotates together with the take-up shaft 22 in one unit through the connecting shaft 30. A ratchet gear 42 is cut in the outer periphery of the gear wheel 38. The gear wheel 38 further has a boss 44 formed coaxially with respect to the ratchet gear 42. A slit 46 is bored in the boss 44. The inner end of a spiral spring 48 is inserted into the slit 46 so as to be retained thereby. The outer end of the spiral spring 48 is retained by a cover 50 which is secured to the outside of the leg plate 20. Accordingly, the spiral spring 48 applies biasing force to the take-up shaft 22 so that the take-up shaft 22 is biased in the direction in which the webbing 24 is wound up (in the direction of the arrow C shown in FIG. 2). However, when the rotation of the gear wheel 38 is suspended, the webbing wind-up force of the take-up shaft 22 is reduced.

The central bent portion of an L-shaped rocker arm 68 is pivotally supported on the seat 26 through a pin 66. A pawl 70 is pivotally suppoted at one end of the rocker arm 68 through a pin 72. The pawl 70 is subjected to the biasing force of a torsion coil spring 74 so as to come close to the ratchet gear 42.

A bent projecting piece 75 is formed at the other end of the rocker arm 68. A notch 76 is provided in the projecting piece 75. An engagement piece 80 with an H-shaped cross-section which is secured to the distal end of a plunger 79 of a solenoid 78 is engaged with the notch 76. The solenoid 78 is secured within the cover 50.

As shown in FIG. 2, both ends of a torsion coil spring 81 are respectively retained at the position A on the side of the rocker arm 68 which is closer to the projecting piece 75 and the position B on the seat 26. The spring 81 is so disposed that it is in a stable state (a state wherein the elastic energy of the spring 81 is relatively small) when the position A exists on either the right or left side (as viewed in FIG. 2) of the imaginary straight line connecting the center of the pin 66 and the position B.

The solenoid 78 is a bidirectional solenoid in which when the direction of the current flowing through the solenoid is reversed, the plunger 79 is moved in the reverse direction.

When the plunger 79 is attracted so as to move in the direction of the arrow X shown in FIG. 2, the rocker arm 68 pivots counterclockwise about the pin 66, thus causing the distal end of the pawl 70 to engage with the ratchet gear 42. The position of the pawl 70 at this time is referred to as the engagement position. In this state, the ratchet gear 42 stops the rotation of the gear wheel 38 in the direction in which the webbing 24 is wound up. Therefore, the biasing force of the spiral spring 48 is prevented from acting on the take-up shaft 22, and the webbing wind-up force is thereby reduced. Since the pawl 70 is able to pivot together with the rocker arm 68, any possible error in mounting the rocker arm 68 is absorbed, and the pawl 70 can reliably engage with the ratchet gear 42.

When the plunger 79 is attracted so as to move in the direction of the arrow Y shown in FIG. 2, the rocker arm 68 pivots clockwise about the pin 66, thus causing the distal end of the pawl 70 to disengage from the ratchet gear 42. The position of the pawl 70 at this time is referred to as the disengagement position. In this state, the take-up shaft 22 is rotatable in both the forward and backward directions (the webbing wind-up and -off directions).

When the pawl 70 is at either the engagement or disengagement position, the torsion coil spring 81 is placed in a stable state, whereby the pawl 70 is reliably held in either the engagement or disengagement position. In other words, the rocker arm 68 performs a snap action by means of the torsion coil spring 81.

Figure 5:
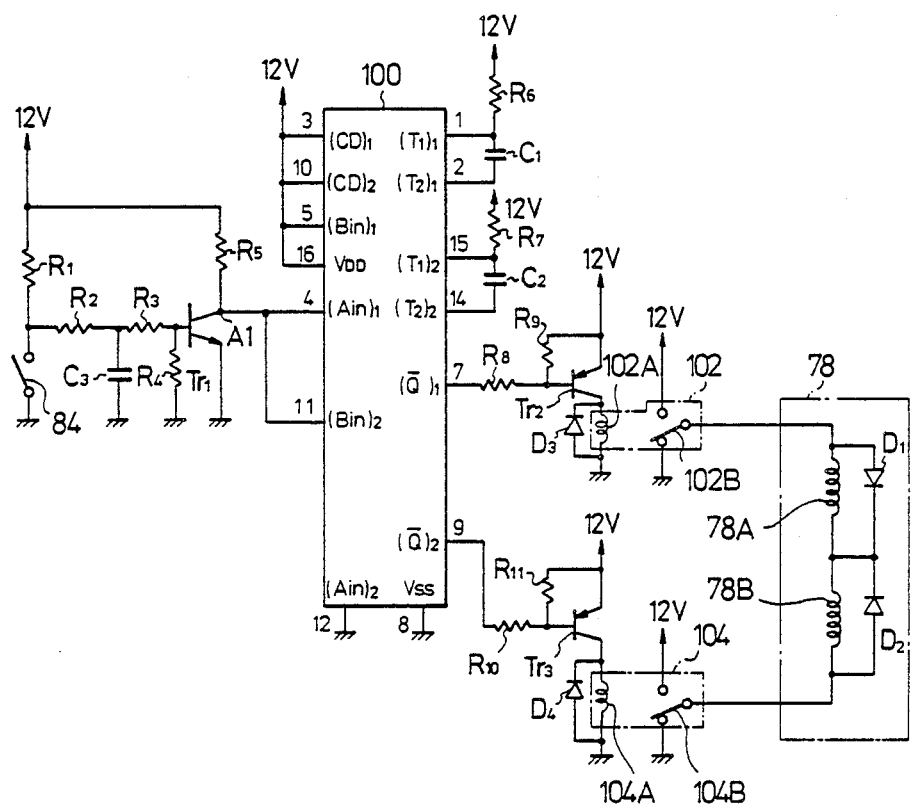
FIG. 5 is a diagram of a control circuit employed in the apparatus according to the present invention.

The control circuit of a controller 64 will next be described with reference to FIG. 5.

This control circuit is constituted by an IC (TC4528BP) 100 as its principal element which incorporates two monostable multivibrators. The IC 100 is supplied with, as an input, a signal delivered from a buckle switch 84 shown in FIG. 4.

The buckle switch 84 is incorporated in a buckle device 82 with which the tongue plate 25 is engaged. The buckle switch 84 is closed only when the tongue plate 25 is engaged with the buckle device 82.

The respective relay coils 102A and 104A of relays 102 and 104 are connected to the output side of the IC 100. When the potential at the point A1 on the input side of the IC 100 rises as shown in FIG. 6, the relay coil 102A is turned ON for only a predetermined period of time $T_1$, while when that potential falls, the relay coil 104A is turned ON for only a predetermined period of time $T_2$. The time $T_1$ and $T_2$ are determined by the respective capacitances of capacitors $C_1$ and $C_2$ which are externally connected to the IC 100. The solenoid 78 has exciting coils 78A and 78B connected in series and diodes $D_1$ and $D_2$ respectively connected in parallel to the exciting coils 78A and 78B. The coils 78A and 78B of the solenoid 78 are respectively connected to the common terminals of the C-contacts 102B and 104B of the relays 102 and 104. The respective normally-closed terminals of the C-contacts 102B and 104B are grounded, and a power of 12 V from a solenoid driving power source is applied to the respective normally-open terminals of the C-contacts 102B and 104B.

It is to be noted that a capacitor $C_3$ on the input side of the IC 100 is provided for the purpose of preventing occurrence of chatter. Further, the reference symbols $R_1$ to $R_{11}$ denote resistors, $Tr_1$ to $Tr_3$ transistors, and $D_3$ and $D_4$ diodes.

The following is a description of the operation of this embodiment arranged as detailed above.

Before the occupant has the webbing 24 fastened, the buckle switch 84 is open. In consequence, both the C-contacts 102B and 104B are placed at the normally-closed side, and the solenoid 78 is therefore OFF. The rocker arm 68 is placed in the position shown by the solid line in FIG. 2 and, hence, the pawl 70 is separated from the ratchet gear 42.

Accordingly, it is possible for the webbing 24 to be wound in and out as desired.

When the occupant unwinds the webbing 24 and engages the tongue plate 25 with the buckle device 82 so as to fasten the webbing 24, the buckle switch 84 is closed. At this time, the relay coil 102A is turned ON for only a predetermined period of time $T_1$ (see FIG. 6), and the C-contact 102B alone is switched and placed at the normally-open side for only the period of time $T_1$.

In consequence, the exciting coil 78B of the solenoid 78 is turned ON, and the plunger 79 is thereby caused to move in the direction X shown in FIG. 2, thus causing the distal end of the pawl 70 to engage with the ratchet wheel 42. Even when the time $T_1$ has elapsed and the solenoid 78 is consequently turned OFF, this engaged state is maintained by virtue of the action of the torsion coil spring 81.

Accordingly, although the webbing 24 is slightly unwound by the action of the occupant, for example, breathing, there is no possibility of the webbing 24 being wound up on the take-up shaft 22; therefore, the occupant feels no pressure from the webbing 24.

When the occupant disengages the tongue plate 25 from the buckle device 82, the buckle switch 84 is opened. At this time, the relay coil 104A is turned ON for only a predetermined period of time $T_2$ (see FIG. 6), and the C-contact 104B alone is switched and placed at the normally-open side for only the time $T_1$. In consequence, the exciting coil 78A of the solenoid 78 is turned ON with the polarity opposite to that in the above-described operation, and the plunger 79 is thereby caused to move in the direction of the arrow Y shown in FIG. 2, thus causing the distal end of the pawl 70 to disengage from the ratchet gear 42. Even when the time $T_2$ has elapsed and the solenoid 78 is consequently turned OFF, this disengaged state is maintained by virtue of the action of the torsion coil spring 81.

Accordingly, the webbing 24 is wound up on the take-up shaft 22 by means of the biasing force of the spiral spring 48 so as to be housed in the webbing retractor 10.

The arrangement may be such that the solenoid 78 is controlled in accordance with whether the occupant has the webbing 24 fastened or not.

Further, the solenoid 78 may be constantly supplied with a very small current for the purpose of more reliably maintaining the pawl 70 at the engagement and disengagement positions.

A bidirectional rotary solenoid may be employed in place of the solenoid 78, and in such case, the pin 66 may be employed as a pivot for the rotary solenoid.

In addition, the retaining means is not necessarily limited to the torsion coil spring 81, and it is possible to employ, for example, a structure in which a projection or a recess is provided on the rocker arm 68, while a recess or a projection which engages with the projection or recess of the rocker arm 68 is provided on the seat 26, and these mating members are resiliently engaged with each other at either the engagement or disengagement position of the pawl 70.

What is claimed is:

1. An apparatus for reducing webbing wind-up force comprising:
    a take-up shaft for winding up an occupant restraining webbing having a tongue plate connected to one end thereof;
    a spiral spring for biasing said take-up shaft in the direction in which said webbing is wound up;
    a ratchet wheel with teeth formed on its entire outer periphery, said ratchet wheel being connected to said take-up shaft so that said ratchet wheel rotates together with said take-up shaft;
    a rocker arm pivotal about its central portion;
    a pawl pivotally mounted at one end of said rocker arm;
    a spring for biasing said pawl toward the teeth of said ratchet wheel;
    a bidirectional solenoid which causes said rocker arm to pivot so that said pawl is engaged with and disengaged from the teeth of said ratchet wheel;
    a snap action spring for retaining said rocker arm at an engagement position at which said pawl is in engagement with said ratchet wheel and at a disengagement position at which said pawl is out of engagement with said ratchet wheel;
    a buckle switch provided on a buckle device which permits said tongue plate to engage therewith, said buckle switch being turned ON when said tongue plate is engaged with said buckle device; and
    means for controlling said bidirectional solenoid such that when said switch is turned ON, said solenoid is activated for a predetermined period of time so that said pawl is engaged with the teeth of said ratchet wheel, while when said buckle switch is turned OFF, said solenoid is activated for a predetermined period of time so that said pawl is disengaged from the teeth of said ratchet wheel.

* * * * *